UNITED STATES PATENT OFFICE.

SARAH SLATER, OF PHILADELPHIA, PA., ASSIGNOR TO HERSELF, HENRY W. GRAY, AND MOSES SMILEY, OF SAME PLACE.

IMPROVEMENT IN COMPOUNDS FOR WELDING, HARDENING, AND TEMPERING STEEL.

Specification forming part of Letters Patent No. 165,378, dated July 6, 1875; application filed April 28, 1875.

*To all whom it may concern:*

Be it known that I, SARAH SLATER, widow, of Philadelphia, Pennsylvania, have invented a certain Compound to be used in Welding, Hardening, and Tempering Steel and Wrought-Iron, of which the following is a specification:

The invention relates to that class of compounds used for welding, hardening, and tempering steel and wrought-iron; and it consists in a composition formed by mixing the following ingredients in about the proportions given: Wrought-iron filings, one ounce; borax, one and a half pound; muriate of ammonia, one-half pound; cyanide of potassium, one quarter pound; prussiate of potash, eleven ounces; corrosive sublimate, one pound; alcohol, one gill. When thoroughly mixed and dried it is reduced or pulverized. For welding, the compound is used dry. For hardening and tempering, it is mixed with water and used in a fluid state.

I am aware that Letters Patents No. 38,554, dated May 19, 1863, were granted to A. Briggs; No. 145,445, dated September 16, 1873, and No. 142,939, dated December 9, 1873, were granted to J. Popping; and No. 147,576, dated February 17, 1874, were granted to H. Schierloh, for the same purpose; but my invention tempers finer, restores ruined iron and steel, and is entirely reliable for jumping or butt-welding.

I claim as my invention—

A compound for welding, hardening, and tempering steel and iron, consisting of a mixture of wrought-iron filings, borax, muriate of ammonia, cyanide of potassium, prussiate of potash, corrosive sublimate, and alcohol, in the proportions as set forth.

In testimony whereof I hereunto sign my mame, in presence of two subscribing witnesses.

SARAH SLATER.

Witnesses:
FRANCIS D. PASTORIUS,
H. W. GRAY.